United States Patent [19]
Gieskieng

[11] 3,820,016
[45] June 25, 1974

[54] METHOD AND APPARATUS FOR THE DETECTION OF CRACKS AND FLAWS IN RAIL WHEELS, RAILS AND THE LIKE BY SLIDING A PRERECORDED MAGNETIC MEDIUM OVER THE TEST PIECE

[76] Inventor: Marion W. Gieskieng, 1333 S. Franklin St., Denver, Colo. 80210

[22] Filed: July 3, 1972

[21] Appl. No.: 268,921

[52] U.S. Cl. ................................................. 324/37
[51] Int. Cl. ............................................. G01r 33/12
[58] Field of Search ..................... 324/37, 38, 34 R

[56] References Cited
UNITED STATES PATENTS

| | | | |
|---|---|---|---|
| 1,702,997 | 2/1929 | Ewing et al. | 324/34 R |
| 2,392,168 | 1/1946 | Mages | 324/38 |
| 2,429,266 | 10/1947 | Gieskieng | 324/37 |
| 2,442,491 | 6/1948 | Gieskieng et al. | 324/37 |
| 2,648,435 | 8/1953 | Kodis | 324/37 |
| 2,882,489 | 4/1959 | Brazitis et al. | 324/37 |
| 2,907,111 | 10/1959 | Calkins | 324/34.1 |
| 3,262,053 | 7/1966 | Nasir et al. | 324/37 |
| 3,267,367 | 8/1966 | Izumiyama | 324/37 |
| 3,341,771 | 9/1967 | Crouch et al. | 324/37 |
| 3,356,938 | 12/1967 | Wood | 324/37 |
| 3,656,054 | 4/1972 | Forster | 324/37 |

FOREIGN PATENTS OR APPLICATIONS

| | | | |
|---|---|---|---|
| 174,415 | 9/1964 | U.S.S.R. | 324/37 |

*Primary Examiner*—Robert J. Corcoran
*Attorney, Agent, or Firm*—Van Valkenburgh, Lowe & Law

[57] ABSTRACT

Apparatus for detecting and locating cracks and flaws at the surface of a magnetized member, and having special utility for detecting and locating cracks and flaws in railroad wheel rims and in rail heads. The member, such as a wheel rim or rail head, is first magnetized. A moving magnetic tape having an alternating magnetic carrier signal is then shifted across the surface of the member. Where the member is sound, this carrier signal will not be affected. However, whenever the tape moves over a crack or flaw at the surface of the member, the carrier signal is disrupted. Thereafter, the tape may be moved through a readout apparatus and any disrupted portions of the carrier signal may be noted and/or recorded.

14 Claims, 29 Drawing Figures

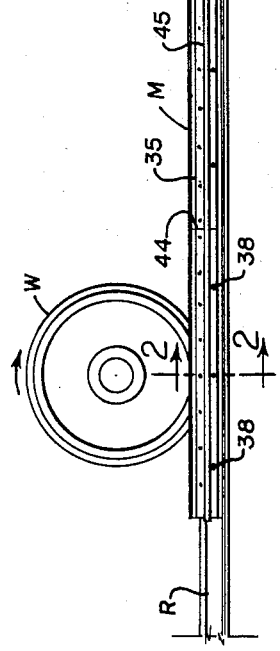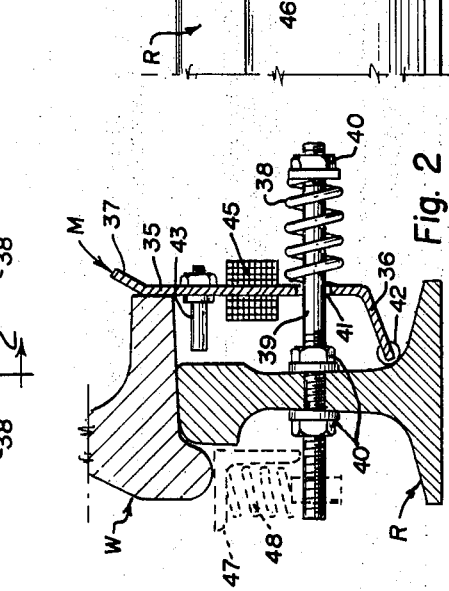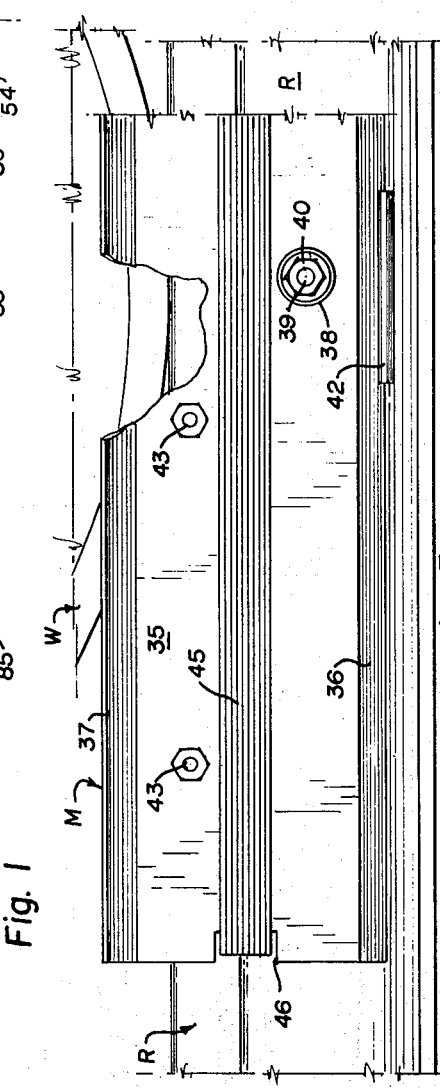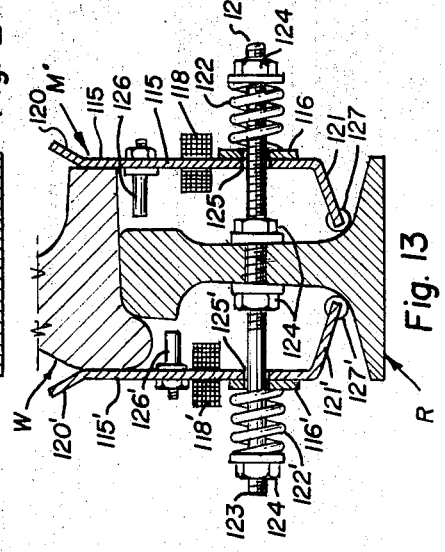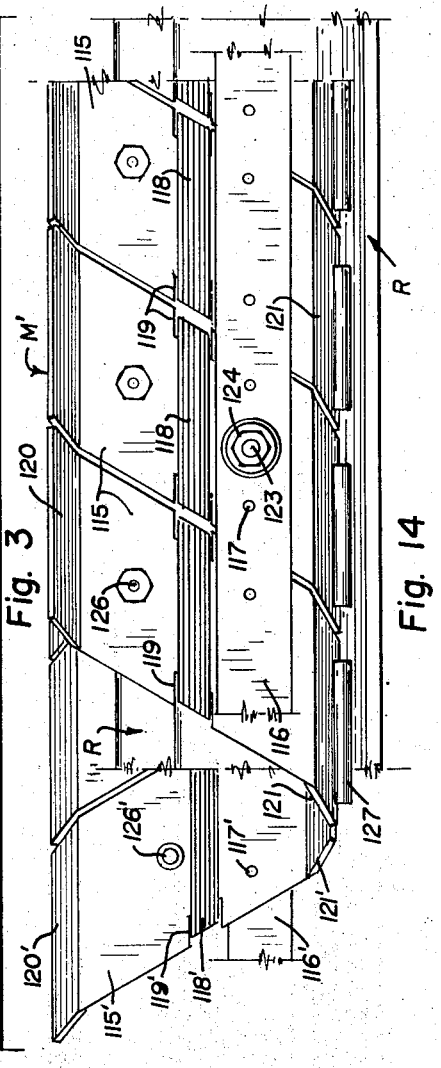

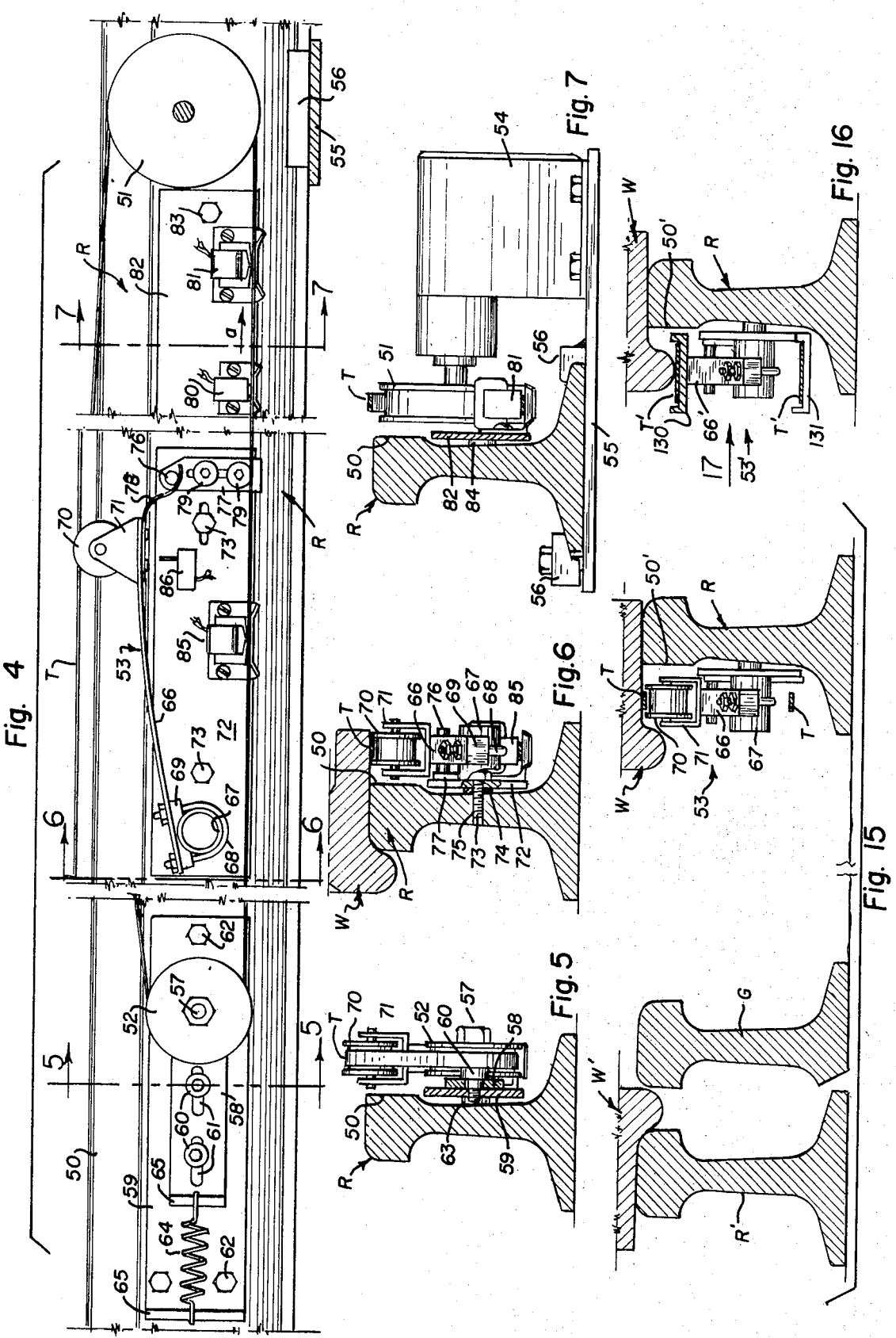

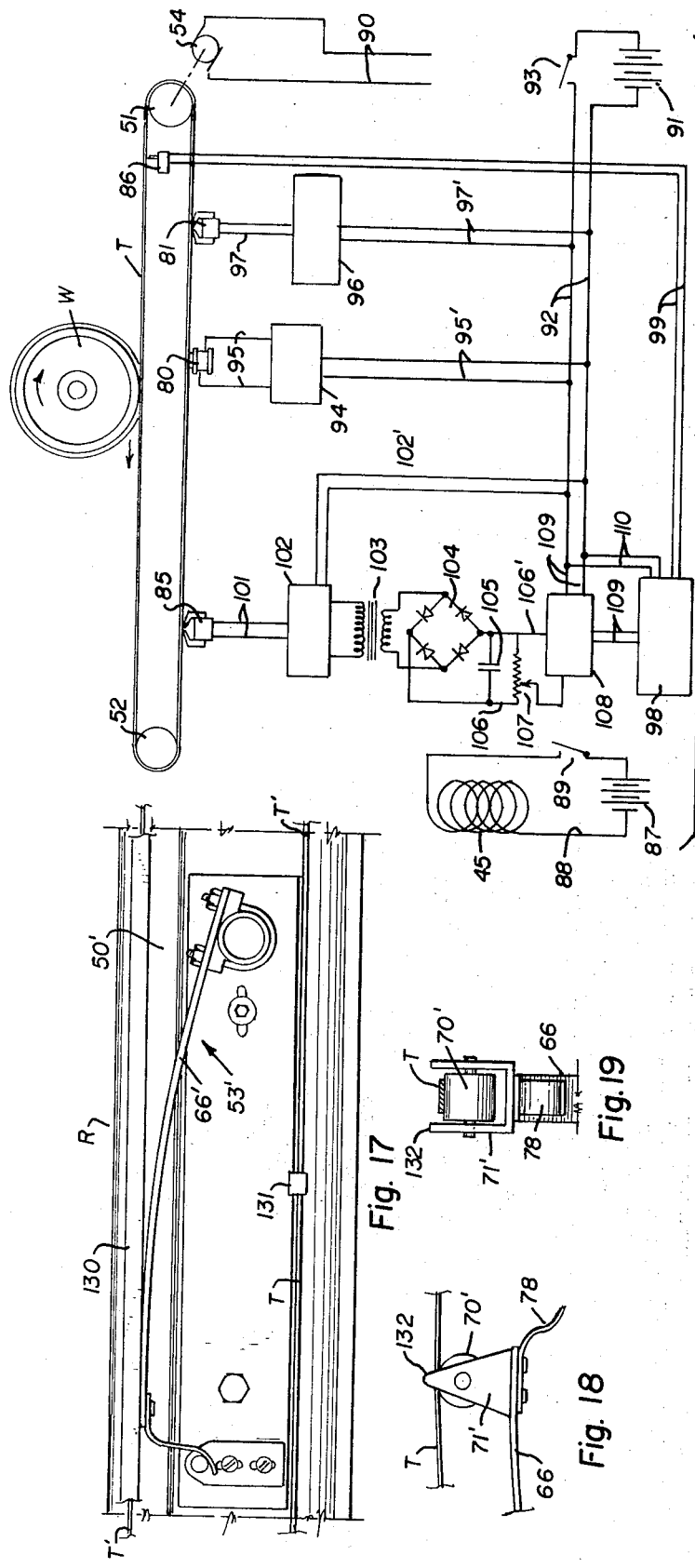

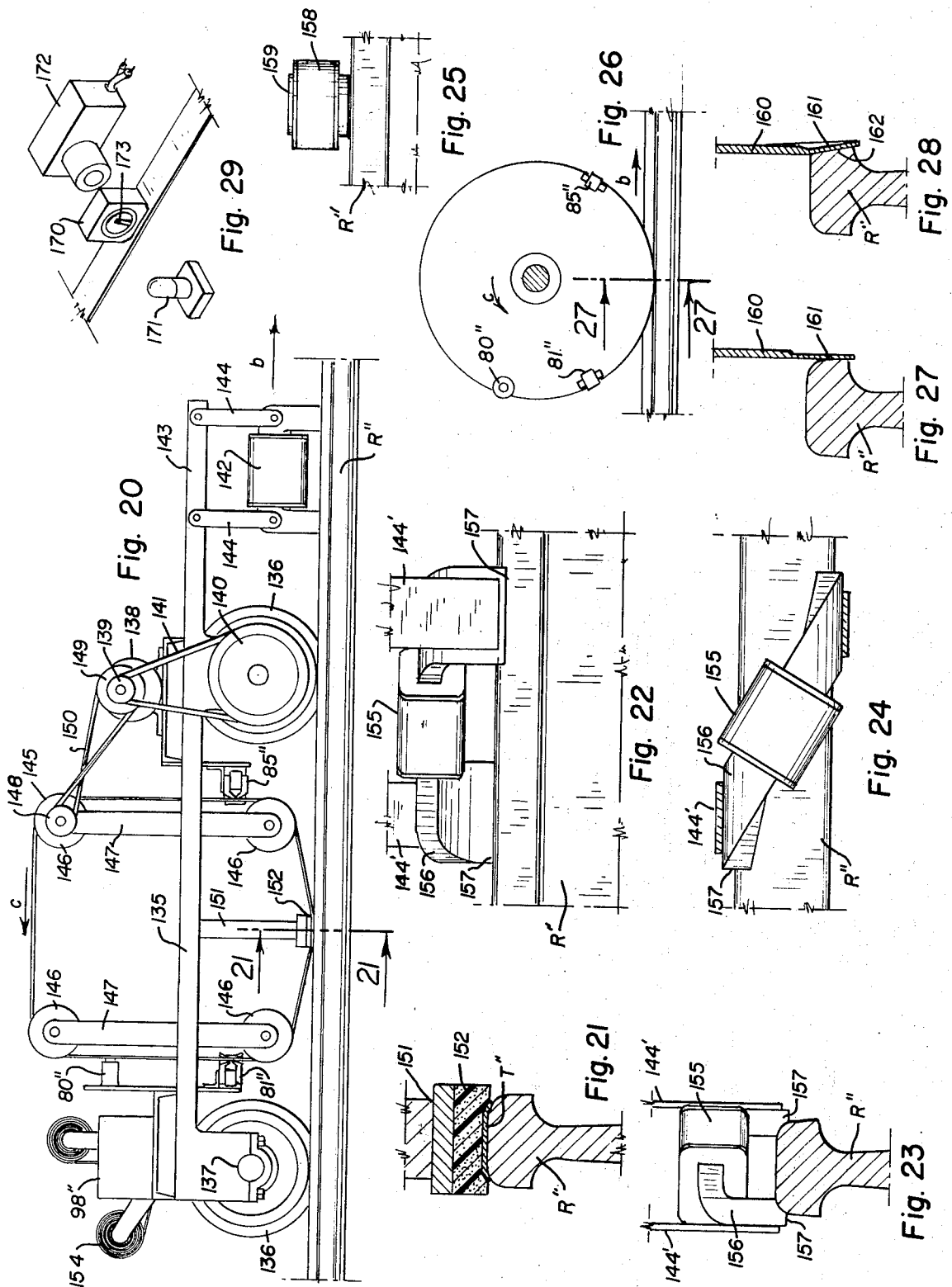

METHOD AND APPARATUS FOR THE DETECTION OF CRACKS AND FLAWS IN RAIL WHEELS, RAILS AND THE LIKE BY SLIDING A PRERECORDED MAGNETIC MEDIUM OVER THE TEST PIECE

This invention relates to methods and apparatus for the detection of cracks and flaws in magnetizable materials, and more particularly to methods for detecting cracks and flaws by sliding a magnetic tape over the surface of a magnetizable material being tested and picking up anomalous magnetic indications produced by any cracks or flaws or discontinuity in the material. The invention is especially useful in detecting cracks and flaws in the wheels of railroad rolling stock and in railroad rails and will be described with reference to such selected uses. It is to be recognized, however, that the invention can be used to advantage in other applications.

The wheels of railroad rolling stock and the rails themselves must be constantly inspected to discover cracks and flaws which will appear from time to time when the rolling stock is being used. Such cracks and flaws, if neglected, will enlarge and eventually cause a failure, sometimes with serious consequences. Such cracks and flaws will appear for various reasons. As a railroad wheel, supporting a substantial load, rolls over many miles of rails, the tread of the wheel rim is continually subjected to reversing stresses which effectively cold work this tread surface rendering the rim of the wheel susceptible to cracking. Likewise, the movement of many heavily loaded wheels upon a rail can cold work the head of the rail to the point where small flaws can progressively enlarge and ultimately cause a failure. Sometimes such cracks may be caused accidentally as by a heavy blow or impact or through other types of abuse. For example, whenever a brake is accidentally set upon a wheel, the wheel rim overheats and the expansion and subsequent shrinkage of the rim will cause thermal cracks through the wheel rim.

Because undesirable cracks and flaws will form in wheels and rails from time to time, it is necessary to continually and periodically inspect railroad wheels and rails. The inspection of the wheels is ordinarily a visual task but the same is nevertheless an expensive procedure. For example, in a train of 100 cars, 800 wheels must be inspected. This requires several hours. However, if a more careful shop inspection of the wheels is to be made, where the trucks are removed from the cars, the cost and the time involved can constitute a major project. The inspection of rails can also be a rather expensive proposition. Various testing devices have been developed for this purpose by using magnetic and ultrasonic phenomena to determine and locate flaws in the rails. It is known that such devices do not always perform satisfactorily. It follows that there is a real and definite need for developing improved devices and systems for checking for cracks and flaws in both wheels and rails.

The present invention was conceived and developed with the above considerations in view. In its essential organization, the invention includes first an apparatus for magnetizing the rim of a wheel, or the head of a rail. When so magnetized, a magnetic circuit is formed within the wheel rim or rail head which is essentially, a closed path and which will not ordinarily produce any significant effects at the surface of the wheel rim or rail head. However, wherever a crack exists, the gap will produce an external magnetic flux or lines of force of sufficient intensity as to be picked up by a magnetometer or on a magnetic tape placed against the rim or rail head surface. In the present invention, a magnetic carrier signal is recorded on the tape at a selected frequency. This tape is then moved over the surface of a magnetized wheel or rail head and at the same time, about the wheel or along a reach of the rail. Whenever the tape moves over a crack or a flaw in the wheel or rail, the external magnetic flux at that point will effectively erase or disrupt the carrier signal on the magnetic tape. This disruption, indicating the presence of a crack or flaw, can be recorded by any suitable read-out instrument.

It follows that an object of the invention is to provide a novel and improved apparatus for the detection of cracks and flaws in various magnetic structural members and especially in railroad wheels and rails.

Another object of the invention is to provide a novel and improved apparatus for detecting cracks and flaws in the rim section of a railroad wheel and which is extended alongside a rail section to effect the detection test about the entire rim or periphery as the wheel rolls along the rail.

Another object of the invention is to provide a novel and improved apparatus for detecting cracks and flaws in the rim section of a railroad wheel which is extended along a rail to permit a detection test to proceed as the wheel rolls along the rail without the necessity of disconnecting the wheel from its car or truck and also, permits all of the wheels in a train to be quickly, accurately and economically checked while the train is moving over the track in a normal manner.

Another object of the invention is to provide a novel and improved method and apparatus for testing a rail which may be conveniently mounted upon a carriage so that it may move along a railroad track to test all rail sections in the track.

Another object of the invention is to provide a novel and improved method for checking for cracks and flaws in the surface of a piece of magnetized material by shifting a moving magnetic tape along the material surface.

Another object of the invention is to provide a novel and improved apparatus and method for checking the magnetic discontinuities at the surface of a piece of magnetized material, such as caused by cracks and flaws, by shifting a moving magnetic tape across the surface of the material, with the tape being rendered highly sensitive to surface discontinuities through the imposition of a magnetic carrier signal upon the tape.

Another object of the invention is to provide a novel and improved apparatus and method for checking crack and flaw-indicating magnetic anomalies in the surface of magnetized material which is simple, quick, reliable and economical.

With the foregoing and other objects in view, all of which more fully hereinafter appear, my invention comprises certain constructions, combinations and arrangements of parts and elements as hereinafter described, defined in the appended claims and illustrated in the accompanying drawing in which:

FIG. 1 is a somewhat diagrammatic side elevational view of a reach of a rail, of a railroad track, which is modified to incorporate the present invention, the figure showing a magnetizing component at one section of the rail reach, a crack detector component at another section of the reach, and two wheels upon the rail at different locations to exemplify the different operations to a wheel when the wheel is being checked for rim cracks and flaws.

FIG. 2 is a transverse sectional view through the rail, the magnetizing component mounted thereon and a fragment of a wheel rim, as taken from the indicated line 2—2 at FIG. 1, but on an enlarged scale.

FIG. 3 is a side elevational view of a portion of the magnetizing component on the same scale as shown at FIG. 2.

FIG. 4 is a side elevational condensed view of parts of the rail and representative parts of the detector component mounted thereon, as shown at FIG. 1 but on an enlarged scale.

FIG. 5 is a transverse sectional view as taken from the indicated line 5—5 at FIG. 4.

FIG. 6 is a transverse sectional view as taken from the indicated line 6—6 at FIG. 4, but on an enlarged scale and showing further, a fragment of a wheel rim upon the rail and contacting the tape of the detector component.

FIG. 7 is a transverse sectional view as taken from the indicated line 7—7 at FIG. 4.

FIG. 8 is a diagram of a circuit which may be used with the apparatus shown at FIGS. 1-7.

FIG. 9 is a diagrammatic view of a fragment of a magnetized wheel rim and of the magnetic detector tape passing underneath and against the tread of the rim to exemplify the use of the apparatus in accordance with the invention.

FIG. 10 is a diagram placed directly below FIG. 9 to represent the carrier, an alternating magnetic field which is imposed upon the detector tape shown at FIG. 9.

FIG. 11 is a diagrammatic view of a fragment of a magnetized wheel rim and of the magnetic detector tape passing underneath and against the tread of the rim, similar to FIG. 9 but with a crack in the rim.

FIG. 12 is a diagram placed directly below FIG. 11 to represent the carrier imposed upon the detector tape, similar to FIG. 10 but showing the manner in which this carrier is erased or distorted by the presence of a rim crack as shown at FIG. 11.

FIG. 13 is a transverse sectional view through a rail and a fragment of a wheel rim, similar to the showing at FIG. 2, but setting forth an alternate construction of the magnetizing component.

FIG. 14 is a side elevational view of a portion of the magnetizing component shown at FIG. 13, but with the rail being broken away to show a fragment of the magnetizing component which appears behind the rail.

FIG. 15 is a condensed transverse sectional view of both rails of a railroad track and of fragments of opposing wheel rims upon these rails, the view showing further, a guard rail at one side of the track and a sectional portion of a detector component, such as that shown at FIG. 6, mounted upon the inside of the rail at the other side of the track to place the tape upon the rim tread adjacent to the wheel flange.

FIG. 16 is a transverse sectional view of a rail head similar to a portion of the showing at FIG. 15, but with a modified magnetic detector component which contacts the periphery of the wheel flange.

FIG. 17 is a side elevational view of a portion of the rail and of a portion of the wheel flange detector component as taken from the indicated arrow 17 at FIG. 16.

FIG. 18 is a side elevational view of a modified form of a tape-carrying wheel which may be used with the detector component.

FIG. 19 is an end view of the tape-carrying wheel shown at FIG. 18.

FIG. 20 is a somewhat-diagrammatic, side elevational view of a carriage mounted upon a railroad track which is adapted to magnetize and to test the head of a rail for flaws in accordance with the principles of the invention.

FIG. 21 is a fragmentary sectional view as taken from the indicated line 21—21 at FIG. 20, but on an enlarged scale.

FIG. 22 is a side elevational view of an alternate construction of a magnetizing component for the head of a rail as it appears when mounted upon the rail.

FIG. 23 is an end view of the magnetizing component shown at FIG. 22.

FIG. 24 is a plan view of the magnetizing component shown at FIG. 22.

FIG. 25 is a side elevational view of another type of a magnetizing component for the head of a rail.

FIG. 26 is a diagrammatic view showing a disc type detector component in operative association with a rail, which may be mounted on a carriage similar to the unit shown at FIG. 20 and which is especially adapted to engage the side of a rail head to locate flaws in a rail which could be missed by the apparatus shown at FIG. 20.

FIG. 27 is a transverse sectional detail as taken from the indicated line 27—27 at FIG. 26, but on an enlarged scale to to illustrate the manner in which the pickup disc engages the side of a rail head.

FIG. 28 is a fragmentary transverse sectional view similar to FIG. 27, but showing the manner in which the rim portion of the disc may flex to fully engage the side of a worn rail head.

FIG. 29 is a fragmentary, diagrammatic view of the tape of a pickup component with a magnetometer and an electric eye sensor being used as a readout device to illustrate another alternate arrangement for detecting magnetic flaws in accordance with the invention.

The several embodiments illustrated in the drawing exemplify the present invention, an apparatus and method whereby cracks or flaws at the surface of a magnetized structural member are detected and located. The first operation is to magnetize the member. Thereafter, a moving magnetic tape is shifted over the surface of the member. This tape has an alternating magnetic carrier signal imposed upon it and whenever the moving tape shifts over a crack or flaw at the surface of the test piece, the disrupted magnetic field at this crack or flaw will erase or modify a portion of the magnetic carrier signal on the moving tape. The magnetic tape is then moved past a pickup head connected to a readout apparatus. As long as the readout apparatus receives the carrier signal from the pickup head, it will not activate, but any portion of the carrier signal which is erased or modified by a crack or flaw will activate the readout apparatus to produce an audible, visual or recorded signal.

The invention is especially adapted to be used in applications where conventional surface testing devices are not suitable and one important embodiment of the invention is an apparatus to check for cracks or flaws at the outer periphery or tread of the wheel rim of a railroad wheel. More important, this apparatus can quickly check all of the wheels in a train of railroad cars while the cars are moving along a track as during their normal travel movements, at a substantial savings over conventional checking operations.

FIGS. 1 to 7 exemplify this wheel checking apparatus. The apparatus is mounted upon a test rail R which, though modified in construction slightly as hereinafter described, may be part of the railroad track where rolling stock will normally move. The apparatus is shown for one rail only, but an identical apparatus may also be installed in the other rail of the track so that all of the wheels of a car can be checked in a single pass.

As shown at FIG. 1, the reach of the test rail R is sufficient to provide two sections, a magnetizing section where the rim of a wheel W is magnetized, as by a magnetizing component, an elongated magnet M and a checking section where the rim of the wheel is checked for cracks by a detector component which includes a moving magnetic tape T. To test the entire wheel rim, the length of each section must exceed the circumference of the tread of the wheel W so that the wheel will turn through a complete revolution while being magnetized by the magnet M and while being checked at the tape T.

It was discovered that the manner in which the wheel rim was magnetized was not critical. The preferred magnetic path would be circumferential, about the rim, and thus be effectively disrupted by any transverse crack through the rim. As a practical matter, however, it was found that the wheel could be magnetized transversely across the rim and that a transverse crack in the rim would still exhibit external disruptive magnetic effects. Accordingly, the magnet M is formed as a very wide, short, upright bar 35 when described with respect to the direction of magnetic flux through it. This bar 35 is angled to provide a base strip 36 which abuts the lower portion of the rail R, at the juncture between the web and the bottom flange of the rail. The center portion of this bar 35 upstands from the strip 36 and is generally parallel to the rail web. The top edge of the bar extends above the rail head to engage the outer edge of a wheel rim as shown at FIG. 2. This top edge of the bar is capped by an outward chamfer fold 37 so that wheel irregularities will push the bar 35 outwardly and prevent the bar from being damaged.

The bar 35 is pivoted about the lower edge of the base strip 36 and is resiliently biased towards the rail head by a plurality of spaced compression springs 38. Each spring 38 is carried upon a rod 39 which extends through a hole in the rail web and is affixed to the web as by nuts 40. Each rod 39 thus outstands from the rail web and extends through a hole 41 in the bar 35. The spring 38 is fitted upon the extended end of the rod 29 and is held by a nut 40, all as shown at FIG. 2. To facilitate the pivotal movement of this bar 35, tubular clips 42 may be secured at the lower edge of the strip 36. To restrict the inward movement of the top edge of the bar 35 towards the rail head when the bar is not being pushed outwardly by a wheel, short spacer rods 43, of non-magnetic material such as brass, are mounted upon the bar 35 to extend towards and to engage the side of the rail head. To insure a maximum flexibility of the magnet, the bar 35 may be formed in several segments along the reach of the rail and abutted together as at 44.

The magnetism, or flux, is induced in this bar 35 by a wide, short coil 45 which parallels the rail R and is held in position about the bar 35 by notches 46 in the ends of the wide bar 35. It is to be noted that with this arrangement, a current in the coil will form a magnetic circuit through the bar which is directed transversely through the rail and thence, transversely through the rim section of the wheel. When the wheel leaves the bar 35, the residual magnetism in the rim of the wheel will have an intensity which can be easily measured. To further intensify the residual magnetism in the wheel rim, if desirable, a conventional angle bar 47 may be mounted at the inner side of the rail head, opposite to the bar 35 as shown in broken lines at FIG. 2. The mounting is preferably upon suitable springs 48 secured to the rod 39, and at a position closely to, or touching the rail head and also bearing against a wheel flange. Considerable latitude is possible in the design of this magnet M. For example, the bar 35 may be of 8-gage metal, constructed as illustrated. The coil may be approximately 200 turns of 14-gage copper wire. With a potential source of 50 volts, a suitable residual magnetism can then be introduced into a wheel rim to permit cracks in the rim to be detected by the detector component, as now described.

The detector component includes a continuous loop of magnetic tape T which is extended alongside the rail R to engage the tread of an outer portion of the wheel rim which overhangs the rail head, as best illustrated at FIG. 6. To increase the rim overhang as much as possible, the outward overhanging side portion of the rail head is cut away as indicated at 50, at FIGS. 5, 6 and 7. This tape T is preferably a metal tape to withstand the abuse to which it is subjected. It is comparatively thin and suitable proportions for a tape were found to be 0.005-inches thick by ½-inch wide. The size of the tape is not at all critical providing that it is sufficiently flexible as to move around a 3-inch or 4-inch wheel and preferably sufficiently thin as to permit a magnetic impulse to be imparted to one side of the tape to be reproduced at the other side.

This tape loop is suspended between a double-flanged drive wheel 51 at one end of its reach and a double-flanged idler wheel 52 at the other end of its reach. A plurality of intermediate supports 53 are mounted upon the rail along the reach of the tape, as will be hereinafter described. The drive wheel 51 is carried upon the shaft of a suitable motor-reducer unit 54. This unit is mounted upon a base plate 55, which, in turn, is secured to the rail flange by cleats 56 as shown at FIGS. 4 and 7.

The idler wheel 52 is carried upon a shaft 57 which outstands from one end of a shift plate 58. The shift plate 58 is slideably mounted upon an elongated support plate 59 by spacer bolts 60 threaded into the support plate 59, with enlarged shaft portions slideably fitting slots 61 in the shift plate as shown at FIGS. 4 and 5. Ths support plate 59 is mounted upon the web of the rail R as by bolts 62 and spacers 63 between the web and the plate. A tension spring 64 connects with lugs 65 at the extended end of the shift plate and at the adjacent end of the support plate. Thus, the pull of the spring urges the shift plate and the idler wheel mounted thereon away from the tape loop to keep the tape loop taut at all times.

The upper reach of this tape alongside the rail is carried by the intermediate supports 53. The drawing at FIG. 1 shows eight such supports but this number can vary as desired. Each support is essentially the same as the others and thus, only one is shown in detail, at FIGS. 4 and 6. Each support includes a resilient cantilevered arm 66 extending alongside the rail R. The base end of the arm is secured to a transversely disposed anchor 67 as by a U-bolt 68 which embraces the anchor 67 and extends through a seating head 69 at the base of the arm. A small, double-flanged idler roller 70 is rotatably mounted in a U-bracket 71 at the extended end of each arm to engage the upper reach of the tape T and the arm 66 may be adjustably pivoted upon its anchor tube 67 to locate the rim of the roller 70 and the tape T at a selected position, normally above the head of the rail so that the tape will always contact the tread of a wheel W upon the track with a moderate degree of pressure. Accordingly, the arms 66 of the several supports 53 will be flexed downwardly whenever a wheel rolls over the rail and actually the wheel will engage the flanges of the roller 70 to push it downwardly and at the same time engage the tape T as illustrated at FIG. 6.

The anchor 67 may be a short tube as illustrated, or a bar of any suitable form. It is affixed to and outstands from a support plate 72 which, in turn, is secured to the rail web by bolts 73. The bolts 73 extend through suitable holes in the support plate, thence through the spacers 74 which hold the support plate a short distance from the rail web, and thence, the bolts are turned into tapped holes 75 in the web of the rail. To limit the upward movement of the cantilevered arm 66, a limit pin 76 is carried upon an adjustment plate 77 to engage an extended finger 78 carried by the arm 66. The plate 77 is slotted and held vertically, for vertical adjustments by lock screws 79.

The detector component includes the tape T, the motor reducer 54 and the several wheels and rollers which hold the tape in position alongside the rail to engage the tread of a wheel. To complete the apparatus, components are associated with the lower reach of the tape to erase, record and pick up signals on the tape. Suitable controls are associated with these components to record, operate and read-out the data obtained with the apparatus as will now be described.

A magnetic erasing head 80 and a carrier-inducing magnetic recording head 81 are mounted upon a support plate 82 to engage the lower reach of the tape T. In the drawing, these components are shown engaging the inner surface of the tape with respect to the loop formed about the drive wheel 51 and the idler wheel 52, while the wheel rim engages the outer surface of the tape. This is optional and does not matter providing that the tape is thin enough to permit magnetic signals to pass through it as heretofore mentioned.

This support plate 82 is mounted upon the rail web by bolts 83 and spacers 84 at a suitable position adjacent to the drive wheel 51, as best shown at FIGS. 4 and 7. Thest two heads, 80 and 81, are physically in tandem with the lower reach of the tape moving through them towards the drive wheel 51, a first through the erasing head 80 and then through the recording head 81 as in the direction of the indicated arrow a. Thus, a magnetic carrier signal is imposed upon the tape after any other signals upon it have been erased. A pickup head 85 is mounted upon a support plate 72 to engage the lower reach of the tape at a location near the idler wheel 52, and its function is to record the tape signals after the tape has moved about its path and has been contacted by the moving tread of a wheel as will be described. To complete the mechanical arrangement of these recording components at the rail, an axle counter switch 86 may be fitted upon a support plate 72 beneath an arm 66 and at any suitable location where it will be actuated whenever the arm 66 is deflected by a wheel.

The control and readout apparatus may be housed in any suitable container, which may be adjacent to, or remote from, the detector component above described. The circuit diagram illustrated at FIG. 8 shows that most of the components are conventional. To energize the magnetizing coil 45, a suitable power source, such as a battery 87, is connected with a circuit lead 88 and is controlled by a switch 89. A conventional A.C. voltage source and its switching control, not shown, will power the motor 54 of the drive system, as through circuit leads 90.

The circuits to the eraser head 80, the carrier signal head 81 and the recorder head 85 may be powered by a common battery 91. Bus leads 92 extend from this battery and include a switch 93. The eraser head 80 may be a simple coil wound about a magnetic armature. It is subjected to a frequency in the approximate range of 1,000 to 2,000 cycles per second. A conventional oscillator 94 connects with the eraser head 80 by leads 95 and with the bus leads 92 by leads 95'. It is to be noted that variations in the construction of the eraser head 80 are possible, and any conventional magnetic device capable of degaussing a tape can be used for the eraser head 80.

The carrier signal recording head 81, which is a conventional type of magnetic head for recording an alternating magnetic signal upon a tape, is adapted to impose a signal upon the tape having a frequency in the range of approximately 200 cycles per second. A conventional oscillator 96, tuned to the desired frequency, is connected to the carrier signal head 81 as by leads 97 and with the bus leads 92 by leads 97'. The permissible range of frequency and the intensity of the carrier signal will depend upon the tape T which is used, the speed of the operation and the intensity of the magnetic disturbances caused by cracks and flaws in the wheels being tested. Preferably, this is a steel tape which can resist the wear and abuse to which it is subjected when rubbing against the tread of a wheel and a high frequency carrier signal was found undesirable in such material because of hysteresis effects, although the actual frequency which may be selected can vary considerably providing the carrier frequency is properly received at the pickup head 85.

The pickup head 85 is connected to amplifying and discriminating circuit components which extend to a readout component 98. The readout component 98 may be of any conventional type which will produce an audible, visual or like signal whenever the tape T indicates a crack or flaw in a wheel rim. Also, and preferably, the readout apparatus 98 may include recording apparatus to provide a permanent record of the wheel flaw indications of a large number of wheels as a train moves over the test rail R. If such a permanent record is desired, the axle counter 86 may be interconnected to the readout apparatus as by a circuit lead 99 and a conventional marking device for the counter pulses will be included in the readout apparatus 98.

The type of amplifying and discriminating components which connect the recorder head 85 with the readout component 98 are best understood by reference to the diagrams shown at FIGS. 9 to 12. In operation of the apparatus, the tape T moves past a wheel W and slides upon the peripheral tread of this wheel as in the direction of the indicated arrow a. As the wheel rolls along the track and over the upper reach of the tape, the tape will slide against the entire peripheral tread of the wheel rim. Whenever the tape is contacting a solid portion of the wheel rim, as shown at FIG. 9, the magnetic carrier signal C is is undisturbed, as shown at FIG. 10. However, if the wheel rim has a crack 100, as shown at FIG. 11, a portion of the moving tape T will slide across this crack 100. The magnetic surface disturbance at the crack 100 will, in effect, erase or modify the alternating magnetic signal and impose a magnetic signal of constant polarity, as indicated as C' of the carrier signal C at FIG. 12. It is to be noted that the intensity of the carrier signal C must be adjusted to be comparable with that of the magnetic surface disturbances of cracks and flaws in the wheel rim, for if the intensity of the carrier signal is too great, the erasing effect of the disturbance will be masked. However, it was found that a properly induced signal could be made by simple adjustments of the voltage from the oscillator. Thus, the readout component 98 must activate whenever the alternating magnetic carrier signal is erased or modified.

Accordingly, leads 101 extend from the pickup head 85 to a band pass amplifier 102 of a conventional type which may be powered by leads 102' and which is tuned to pass signals at only the selected carrier frequency. This signal is coupled through a transformer 103 to a full-wave rectifier 104. The output of this rectifier is essentially levelled by a shunting capacitor 105 across the output leads 106 and the output is controlled by a potentiometer 107. The output leads 106' connect with a trigger 108, of any conventional type which actuates responsive to a drop in voltage in the leads 106. The trigger 108 is connected to the readout 98 by leads 109. The trigger 108 and the readout 98 connect with the bus lead 92 as by leads 109 and 110 respectively, to complete the circuit.

The operation of this apparatus is manifest from the foregoing description and it is apparent that a single wheel, or a sequence of wheels, can be tested and any readout apparatus suitable for obtaining a desired type of result can be used.

A number of variations and modifications to the several components of the apparatus heretofore described are possible. FIGS. 13 and 14 exemplify a more sophisticated magnet M' which will induce a magnetic path through the rim of a wheel at an inclination with respect to the edges of the rim, in contrast to the apparatus heretofore described where the magnetic path is essentially normal to the edges of the rim. FIGS. 15, 16 and 17 show modified arrangements of the tape carrying components to place the tape at the inner portion of the wheel tread or upon the wheel flange, in contrast to the apparatus heretofore described where the tape contacts the outer portion of the wheel tread. FIGS. 18 and 19 show a simple modification of a tape carrier roller. FIGS. 20 – 28 show a different embodiment of the invention which is used to check for flaws and cracks in the head of a rail. FIG. 29 shows an arrangement where a simple magnetometer may be used to indicate the signals produced by flaws and cracks in a wheel or a rail in accordance with the invention.

The magnet M', shows at FIGS. 13 and 14, is formed as an extended array of magnetic bars 115 mounted side by side. Together, these bars are similar in appearance to the bar 35 heretofore described. These bars 115 are held together by an elongated strip 116 of non-magnetic material such as brass, and are connected to the strip by rivets 117. Each magnetic bar is embraced by a coil 118 of wire which is held in place by notches 119 at opposite sides of the bar. The several coils 118 of the array of bars are connected in series, or in parallel, to a power source in a conventional manner.

Each bar 115 is a flat upright member which is inclined to one side as hereinafter described. Each bar has an outward chamfer fold 120 at its top and an inward base fold 121, with the lower edge of this base fold abutting against the web of the rail R. The bars 115, held together by the strip 116, thus pivot about the lower edges of their base strips 121 and the top portions are resiliently biased towards the rail head by compression springs 122. Each spring 122 is carried upon a rod 123 which is mounted in a hole in the rail web to extend from each side thereof and each rod 123 is affixed to the rail head by nuts 124. The rods extend through holes 125 in the bars 115 and in the strip 116 so the springs 122 may be fitted upon the extended ends of the rods and held in position by nuts 124. Non-magnetic spacer rods 126 are mounted at the tops of the bars 115 to extend towards and to engage the outer side of the rail head to limit the inward movement of these bars 115. To complete the organization, tubular clips 127 may be fitted about the bottom edges of the base folds 121 where the folds contact the rail.

Another set of magnet bars 115' of substantially identical construction, though differing slightly in proportion, is mounted upon the opposite inner side of the rail. These bars 115' are connected to a strip 116' of non-magnetic material as by rivets 117'. A coil 118' embraces each bar 115' and is held in place by notches 119' at opposite sides of the bar. Each bar member includes a top chamfer fold 120', outwardly from the rail head, and a base fold 121' which turns inwardly to the rail so its lower edge abuts against the web of the rail R. One side of each rod 123 extends from the rail and through a hole 125' in a bar 115' and in the strip 116'. Springs 122' are mounted upon these rods to urge the top edges of the bars 115' towards the rail head. Also, spacer rods 126' are mounted upon the bars to extend towards and to engage the inner side of the rail head and to complete the organization, tubular clips 127' are fitted to the bottom edges of the base folds 121' where the folds contact the rail. The individual magnet bars 115 are angled with respect to the vertical at an angle of approximately 30° to offset the top chamfer fold 120 from the lower edge of the base fold 121.

The opposite magnet bars 115' are folded in a like manner but are inclined in the opposite direction, and preferably the bottom edge of a bar 115 will be opposite to a bottom edge of a bar 115' to produce a magnetic path which is angled at the tops of the bars 115 and 115' where they are contacted by a wheel rim. Therefore, to complete the magnetic circuit induced by the coils 118 and 118', the wheel rim is magnetized in an angular pattern.

In the modified construction shown at FIG. 15, the tape T is placed at the inner side of the rail R to engage a wheel tread adjacent to the inner flange of the wheel. This will require a modification of the rail R by cutting away the inner portion of the rail head 50' to provide clearance for the tape T. In addition, the rail R may be shifted outwardly a short distance from its normal position to engage the outer edge of the rim of the wheel W and increase the space where the tape T will engage the wheel rim. With the tape T adjacent to the inner flange of the wheel, an arrangement is necessary to hold the wheel W in position against lateral shifting. Ordinarily, a pair of wheels is mounted upon a common axle in a standard manner, not shown, so that each wheel will roll upon a rail of the track. Thus, it is a simple matter to provide a guard rail G alongside the opposite rail R' of the track to permit the flange of the opposite wheel W' to be confined between the rail R' and the guard rail G to prevent shifting as illustrated.

This detector component, which consists of a tape T, is mounted between a drive wheel 51 and an idler wheel 52 and the upper reach of the tape is held by intermediate supports 53. These components are identical in construction to the detector component heretofore described at FIGS. 1 to 7, excepting that the parts may be reversed from a right hand to a left hand arrangement as appears by a comparison of FIGS. 6 and 15. The manner of operation of the apparatus is the same as that heretofore described.

A further modification of the apparatus is possible to check the wheel flange of a railroad wheel. Such a flange, which projects a short distance below the tread of the wheel, is located at the inner side of the wheel, with respect to the manner in which the wheel is mounted upon an axle. A flange may not only be cracked, as by a transverse crack extending through the rim of the wheel, but also portions of the flange may be chipped away due to abuse or other causes. Whenever a wheel rim is magnetized, a magnetic surface anomaly will occur in a transverse crack through the rim. Also, a magnetic surface anomaly can occur where a portion of a wheel rim is chipped out of the rim as by a flaw occurring in the flange or by abuse. Such flaws and chips can be picked up by the use of a tape T' which extends between a drive wheel and an idler wheel as heretofore described. The upper reach of tape between these wheels, at each end of the section, is carried in a continuous, flexible channel 130 which is supported upon the cantilevered arms 66' of an array of support sections 53', a typical support section being shown at FIG. 17. The channel 130 is positioned so that it is directly below the wheel flange. It is pushed upwardly and against a wheel flange while the tape is moving within the channel and engaging the wheel flange. It follows that the channel must be of a tough material with a low coefficient of friction and it is preferably made of nylon or teflon, to provide a fair degree of flexibility, strength and a slick, wearfree surface whereon the tape T'' slides. Cantilever arms 131 at the intermediate sections hold the lower reach of the tape.

FIGS. 18 and 19 show a modified construction of the tape supporting rollers which are mounted upon the cantilevered arms 66. A roller 70' is formed as a cylindrical member without flanges, and the bracket 71' includes apex points 132 which extend above the roller to hold the tape in place. This construction permits a roller to spin freely when the assembly is pressed downwardly by a railroad wheel.

The present invention may be used in apparatus which will check for cracks and flaws in the rails of a railroad track. FIG. 20 shows, in a somewhat diagrammatic manner, a carriage 135 which is mounted upon two pairs of rail wheels 136 for movement along a track. This carriage 135 will carry a track magnetizing unit and a track checking apparatus which functions as hereinafter described. Only one apparatus, for one rail R'', is shown, but it is to be understood that comparable apparatus may be provided for the other rail to check both rails of the track simultaneously.

The carriage 135 is made of framework members having bearings 137 to support the wheels 136. A motor 138 is mounted upon the carriage above a drive wheel to drive it along the track and this motor may be connected with the wheel through a pulley 139 on the motor and a pulley 140 on the wheel shaft, which are connected by a belt 141. The motor 138 is illustrated as being an electrical motor and suitable batteries, not shown, may be used to drive this motor and other components as will be described.

To check the head of a rail R'' it must first be magnetized and a magnet 142 is suspended from a forwardly extended, cantilevered arm 143, the forward extension being with respect to the direction of movement of the carriage as indicated by the arrow b. This magnet 142 is held by a pair of links 144 which are pivoted to the arm 143 and to the body of the magnet to permit the magnet to contact and to drag along the rail head, but to swing upwardly and rearwardly and out of the way of any irregularity or obstruction on the rail.

This magnet, which is illustrated as having a U-shaped core, is powered by electrical components, not shown. This magnet will introduce a residual magnetism in the rail as it moves along and this residual magnetism will produce a magnetic surface anomaly at any crack or flaw in the surface of the rail head which can be picked up by the rail checking apparatus, a moving tape T'' mounted upon the carriage 135.

The tape T'' forms a closed loop and is extended about a drive wheel 145 and three idler wheels 146 which are mounted upon framework members 147 to define a generally rectangular tape path with the lower reach of the tape being adjacent to the rail. The drive wheel 145 is powered by the motor 138. A pulley 148 is mounted on the shaft of the drive wheel, a pulley 149 is mounted on the shaft of the motor and these pulleys are interconnected by a belt 150. The belt is crossed, as illustrated, to move the tape in the same direction as the carriage movement at the point where the tape engages the head of the rail R'', as illustrated.

This engagement of the rail R'' with the tape T'' is effected by an inverted post 151 which depends from a frame member of the carriage 135. A resilient, plastic pad 152 of a low-friction material, such as a lubricated, hollow, nylon member, is attached to the bottom of this post to hold the tape in place against the rail. This pad is adapted to yield to conform with the shape of the head of a rail and accordingly, the tape between the pad and the rail head will deflect to more effectively engage the rail head, especially where the rail head is rounded. The electronic components associated with this tape are the same as those heretofore described and include an eraser head 80'', a recorder head 81'' and a pickup head 85''. These components are mounted at suitable locations upon framework members of the carriage 135 so that with the movement of a tape as in the direction of the indicated arrow 'c', the tape will first move past the eraser head 80'' which will remove any magnetic signals from it. It will thereafter move past a recorder head 81'' which will record a magnetic carrier at a selected frequency upon the tape. Once this tape moves past the recorder head 81'', it will then pass underneath the post pad 152 and slide against the surface of the rail R''. Thence, the tape will move past the pickup head 85''. Any portion of the carrier signal which is modified by a magnetic anomaly on the rail head will then be recorded by a readout apparatus.

The electrical circuits which actuate the eraser 80'', the recorder 81'' and the pickup head 85'' are essentially the same as heretofore described and the information obtained from the pickup head 85'' will be directed to a readout device 98''. This readout device 98'' will thus indicate flaws or cracks in a rail head by a visual, audible or recorded signal. Preferably, where long lengths of rails are checked, the readout apparatus will record on a continuous roll of tape as at 154. Also, it is to be noted that if the rail R'' is not a continuous rail, but is formed of rail sections in tandem, the recording apparatus will record the end of each rail section and thus provide an indication to assist in locating any flaw or crack in the rail head.

FIGS. 22, 23 and 24 show a modified magnet 155 for imparting magnetic flux to the rail head of the rail R'', the purpose of this magnet being to direct the magnetic flux in a path across the rail head and at an angle thereto. This magnet 155 is provided with an angled, U-shaped core 156 having its ends 157 engaging opposite sides of the rail head and with the crotch of the U-shaped core being inclined with respect to these ends 157. This magnet will be mounted upon links 144' similar to the links 144 heretofore described.

It is to be noted that yet other magnetic devices may be used to impart flux to the rail and a very simple type of magnet is illustrated at FIG. 25. A coil 158 is wound about a straight core 159 and is carried above the rail head in any suitable manner so that one end of the core 159 engages the rail head R''. Such a magnet is not nearly as efficient as the magnets heretofore described, but the same can be used to impart residual magnetism to the rail.

The diagrammatic sketch at FIG. 26 indicates the manner in which a vertical disc 160 can be used as the rail checking apparatus in lieu of a tape. The disc 160 may be mounted upon a carriage such as the carriage 135 shown at FIG. 20, and it will be rotated against the movement of the carriage so that the lower peripheral flange 161 of the disc will wipe against the side of a rail R'' as illustrated at FIG. 27. This flange 161 will be a thin, magnetizable member, preferably of metal. Magnetic signals will be imparted to it the same as heretofore described, and the organization will include an eraser head 80'', a recorder head 81'' and a pickup head 85''. These heads will be located on the disc to function in the same manner as heretofore described, that is, to erase signals on the disc, to then impose a carrier signal upon it, to wipe against the side of the rail R'' and then move the carrier signal past the pickup head 85'' to record any changes in signal which would indicate a crack or flaw in the rail. It is to be noted that in checking the side of a rail, there always exists the possibility that this rail may be worn at an angle so that the sides of the rail head are not perpendicular, but are inclined as indicated at 162 at FIG. 28. Where such is apt to occur, the peripheral flange of the disc 161 may be of comparatively thin material so that it will flex to conform with a slanted side 162 of the rail as at FIG. 28.

It is apparent that a number of variations are possible in designing components which can be used in connection with the present invention. For example, FIG. 29 shows a simplified form of a readout apparatus. A magnetometer 170 is mounted in any suitable manner to engage the moving tape T. A light 171 is provided at one side of this magnetometer and an electric eye sensor 172 is provided at the underside thereof. The flux arm 173 of the magnetometer will normally intercept the light ray from the light 171 to prevent it from extending to the electric eye sensor 172. Whenever a magnetic pulse is imposed upon the magnetometer, however, the arm 173 will flex to permit the light ray to activate the electric eye sensor, which, in turn, will actuate a suitable warning signal associated with the electric eye. This arm 173 has sufficient inertia as to render it immobile whenever an alternating carrier signal at selected frequencies is imposed upon the tape. If, however, the signal on the tape is modified by a crack or flaw in the item being tested by the tape, such as a wheel, the arm 173 will deflect sufficiently to permit light to trigger the electric eye.

I have now described by invention in considerable detail. However, it is obvious that others skilled in the art can build and devise alternate and equivalent constructions which are nevertheless within the spirit and scope of my invention. Hence, I desire that my protection be limited, not by the constructions illustrated and described, but only by the proper scope of the appended claims.

I claim:

1. An apparatus for locating cracks and flaws at the head of a railroad rail, comprising, in combination:
   a carriage adapted to move along a course defined by the rail;
   a magnetizing means carried by the carriage adapted to magnetize the head of the rail head of the carriage movement;
   a loop of magnetic tape mounted in the carriage having a portion engaging the rail head;
   a means for continuously moving the tape about its loop path at a rate and in a direction which effects sliding of the tape on the rail head when the carriage is moving;
   a means for engaging the moving tape against the rail head while the carriage is moving along the rail head whereby to scan the reach of the magnetized rail head;
   a first magnetic head means adapted to erase all magnetic signals upon the tape as the tape moves toward engagement with the rail;
   a second magnetic recorder head adapted to impose an alternating magnetic carrier signal upon the erased portion of the tape before the tape engages the rail; and
   a magnetic head to pick up the alternating magnetic carrier signal after the tape has contacted the rail head to sense any discontinuity of the carrier, which discontinuity indicates a crack or flaw.

2. The apparatus defined in claim 1 wherein said magnetizing means includes an electromagnet having an armature extending from each end as a partial loop to embrace opposite sides of the rail head to engage the rail head and form a magnetically closed circuit with the rail head.

3. In the organization defined in claim 2 wherein the magnet armature is inclined with respect to the rail head whereby to produce a magnetic flux path which is angled with respect to the longitudinal axis of the rail.

4. A process for locating cracks and flaws at or near a selected surface portion of the surface of a magnetizable item to be tested by means of a magnetic recording media comprising the steps of:
- magnetizing the item to produce a residual magnetism therein which produces magnetic leakage fields at any crack or flaw at or near the aforesaid selected surface portion;
- erasing residual signals which may be impressed upon said magnetic recording media prior to its engagement with said selected surface portion;
- then imposing an alternating carrier signal upon said magnetic recording media prior to its engagement with said selected surface portion;
- sliding said magnetic recording media against the selected surface portion in a first direction while simultaneously moving said recording media over the entire selected surface portion to sense said leakage fields;
- detecting said carrier signal on said media after it has contacted the selected surface portion;
- converting said carrier signal to an alternating current, the voltage of which is proportional to the intensity of the magnetic signal;
- discriminating said alternating current to isolate distortions of said alternating current caused by magnetic anomalies; and
- displaying said isolated distortions as indicative of cracks or flaws at or near the selected surface portion of the item.

5. The process defined in claim 4 wherein the item to be tested is a wheel and the surface considered is the rim of said wheel.

6. The process defined in claim 4 wherein the magnetizable item to be tested is a rail head.

7. An apparatus for locating cracks or flaws at or near the surface of a magnetizable item, comprising:
- a test chassis, including means adapted to support and move said test chassis in a predetermined direction with respect to said surface of said magnetizable item;
- magnetizing means affixed to said test chassis and adapted to induce a magnetic field in said magnetizable item;
- a continuous magnetic recording medium;
- support means for said continuous magnetic recording medium affixed to said test chassis and adapted to slide said continuous magnetic recording medium across the surface of the magnetizable item;
- drive means for said continuous magnetic recording medium adapted to transport said continuous magnetic recording medium over the surface of the magnetizable item in a predetermined direction and cooperating with the speed of movement of said test chasis such that said medium slides on the surface of the item;
- a magnetic erase head adapted to erase said continuous magnetic recording medium;
- a magnetic recording head positioned adjacent to said continuous magnetic recording medium and between said magnetic erase head and said magnetizable item and further configured such that said continuous magnetic recording medium passes over said magnetic erase head, said magnetic recording head and then said magnetizable item sequentially;
- an a.c. signal means for providing driving current to said magnetic recording head;
- a magnetic read head positioned adjacent said continuous magnetic recording medium, said magnetic read head further positioned to engage said continuous magnetic recording medium after it contacts said magnetizable item; and
- means to record data detected by said magnetic read head.

8. An apparatus as defined in claim 7 wherein said magnetic recording medium is a magnetic tape.

9. An apparatus as defined in claim 7 wherein said magnetic recording medium is a magnetic disc.

10. An apparatus as defined in claim 8 wherein said magnetizable item is a wheel.

11. An apparatus as defined in claim 8 wherein said magizable item is a rail head.

12. An apparatus as defined in claim 9 wherein said magizable item is a wheel.

13. An apparatus as defined in claim 9 wherein said magnetizable item is a rail head.

14. A process as defined in claim 6 wherein the residual magnetism imposed in the rail head is diagonal with respect to the longitudinal axis of the rail.

* * * * *